(12) United States Patent
Ogawa et al.

(10) Patent No.: US 12,269,324 B2
(45) Date of Patent: Apr. 8, 2025

(54) AUTOMOBILE WEATHER STRIP

(71) Applicant: Nishikawa Rubber Co., Ltd., Hiroshima (JP)

(72) Inventors: Hirofumi Ogawa, Hiroshima (JP); Haruki Sentani, Hiroshima (JP)

(73) Assignee: Nishikawa Rubber Co., Ltd., Hiroshima (JP)

(*) Notice: Subject to any disclaimer, the term of this patent is extended or adjusted under 35 U.S.C. 154(b) by 0 days.

(21) Appl. No.: 18/509,638

(22) Filed: Nov. 15, 2023

(65) Prior Publication Data
US 2024/0198774 A1 Jun. 20, 2024

(30) Foreign Application Priority Data

Dec. 19, 2022 (JP) ................. 2022-202291

(51) Int. Cl.
| | |
|---|---|
| *B60J 10/86* | (2016.01) |
| *B29D 99/00* | (2010.01) |
| *B60J 10/16* | (2016.01) |
| *B60J 10/23* | (2016.01) |
| *B60J 10/24* | (2016.01) |
| *B60J 10/36* | (2016.01) |

(52) U.S. Cl.
CPC .......... *B60J 10/86* (2016.02); *B29D 99/0003* (2013.01); *B60J 10/16* (2016.02); *B60J 10/23* (2016.02); *B60J 10/24* (2016.02); *B60J 10/36* (2016.02)

(58) Field of Classification Search
CPC ............ B60J 10/86; B60J 10/23; B60J 10/24
See application file for complete search history.

(56) References Cited

U.S. PATENT DOCUMENTS

| | | | |
|---|---|---|---|
| 5,222,336 A * | 6/1993 | Yada | B60J 10/21 |
| | | | 52/204.597 |
| 5,613,326 A * | 3/1997 | Inoue | B60J 10/79 |
| | | | 49/476.1 |
| 9,415,671 B2 * | 8/2016 | Sentani | B60J 10/235 |

FOREIGN PATENT DOCUMENTS

| | | |
|---|---|---|
| JP | S52-045928 U | 3/1977 |
| JP | S61-020450 U | 2/1986 |
| JP | S62-038746 U | 3/1987 |
| JP | H03-022955 U | 3/1991 |
| JP | H4-151330 A | 5/1992 |
| JP | H05-010055 U | 2/1993 |
| JP | H07-237223 A | 9/1995 |
| JP | H11-227544 A | 8/1999 |

(Continued)

*Primary Examiner* — Marcus Menezes
(74) *Attorney, Agent, or Firm* — Renner, Otto, Boisselle & Sklar, LLP

(57) ABSTRACT

An automobile weather strip includes an extrusion-molded portion and a die-molded portion. The die-molded portion includes: a mount base to be mounted on the periphery of the door; and a hollow seal integrally molded with the mount base and coming into elastic contact with the circumferential edge of a vehicle body opening. The mount base includes a bottom in the shape of a plate. The bottom has a core removal slit for removing a core, and the core removal slit extends in a longitudinal direction of the die-molded portion. The core removal slit has a length set shorter than the length of the core in the same direction. The bottom includes a thick-walled portion at a portion adjacent to an edge of the core removal slit. The thick-walled portion is thicker than the other portions of the bottom.

5 Claims, 16 Drawing Sheets

(56) References Cited

FOREIGN PATENT DOCUMENTS

| | | |
|---|---|---|
| JP | 2001-114036 A | 4/2001 |
| JP | 2016-165960 A | 9/2016 |

* cited by examiner

AUTOMOBILE WEATHER STRIP

CROSS-REFERENCE TO RELATED APPLICATION

This application claims priority to Japanese Patent Application No. 2022-202291 filed on Dec. 19, 2022, the entire disclosure of which is incorporated by reference herein.

BACKGROUND

The present disclosure relates to an automobile weather strip to be attached to an automobile door.

A weather strip is attached to the periphery of an automobile door and seals the gap between the circumferential edge of a vehicle body opening and the periphery of the door. The weather strip according to Japanese Unexamined Patent Publication No. 2016-165960 is obtained by connecting an extrusion-molded portion and a die-molded portion. The die-molded portion includes a hollow seal and a mount base to be mounted on the periphery of a door. The mount base has in its bottom: a clip attachment hole in which a clip configured to engage with the periphery of the door is attachable; a core removal slit for removing, after molding, the core used to form the inner surface of the hollow seal; and a vent hole for keeping the hollow seal from sticking at the time of removing the core.

The weather strip according to Japanese Unexamined Patent Publication No. 2001-114036 as well is obtained by connecting an extrusion-molded portion and a die-molded portion. A mount base of the die-molded portion has, in its bottom, a clip attachment hole and a core removal slit. The core removal slit is bent in the transverse direction of the vehicle, avoiding the clip attachment hole.

The weather strip according to Japanese Unexamined Patent Publication No. H4-151330 as well is obtained by connecting an extrusion-molded portion and a die-molded portion. Japanese Unexamined Patent Publication No. H4-151330 discloses an embodiment including a core removal slit on a side surface (or a rear surface) of a mount base of the die-molded portion.

SUMMARY

The longitudinal position of the clip attachment hole in the mount base of the die-molded portion is determined under the restriction of the attachment position on the door. Thus, the core removal slit, the clip attachment hole, and the vent hole are sequentially aligned as in the die-molded portion of Japanese Unexamined Patent Publication No. 2016-165960. On the other hand, the core extends from the hollow seal of the die-molded portion to the hollow seal of the extrusion-molded portion. At the time of forming the die-molded portion, the core is inserted in the hollow seal of the extrusion-molded portion so as not to allow the flow of the material of the die-molded portion into the hollow seal of the extrusion-molded portion. That is, since the core is longer than the core removal slit, the core needs to be removed forcibly from the die-molded portion with the die-molded portion stretched longitudinally.

When the die-molded portion is stretched longitudinally, an edge of the core removal slit strongly comes into elastic contact with an end of the core and is stretched, which may cause breakage at the edge of the core removal slit. A core removal slit with a breakage at the edge is defective. Therefore, repair with an adhesive may be needed, or if the degree of the breakage is great, the weather strip may be discarded.

To address the problem, as in Japanese Unexamined Patent Publication No. 2001-114036, for example, the core removal slit is bent in the transverse direction of the vehicle to avoid the clip attachment hole. This can increase the length of the core removal slit and is thus believed to reduce breakage at the edge of the core removal slit at the time of removing the core. However, in order to bend the core removal slit in the transverse direction of the vehicle, it is necessary to increase the transverse size of the bottom of the mount base. Depending on the type, the vehicle may fail to ensure such a transverse size.

The core removal slit, if formed in a side surface (or the back surface) of the mount base of the die-molded portion as in Japanese Unexamined Patent Publication No. H4-151330, allows an increase in the length of the core removal slit without a need to consider the clip attachment hole. Thus, breakage is believed to be less likely to occur at the edge of the core removal slit at the time of removing the core. However, in order to form the core removal slit in the side surface of the mount base, it is necessary to increase the size of the mount base in the height direction. Depending on the type, the vehicle may fail to ensure such a size in the height direction.

The present disclosure was made in view of the problems. It is an objective of the present disclosure to keep breakage at the edge of a core removal slit from occurring at the time of removing the core after forming.

In order to achieve the above objective, a first aspect of the present disclosure assumes an automobile weather strip to be attached to a periphery of a door of an automobile to seal a gap between a circumferential edge of a vehicle body opening and the periphery of the door. The automobile weather strip includes: an extrusion-molded portion formed by extrusion molding; and a die-molded portion formed by molding die and connected to a longitudinal end of the extrusion-molded portion. The extrusion-molded portion includes: a mount base to be mounted on the periphery of the door; and a hollow seal integrally molded with the mount base and coming into elastic contact with the circumferential edge of the vehicle body opening. The die-molded portion includes: a mount base to be mounted on the periphery of the door; and a hollow seal integrally molded with the mount base and coming into elastic contact with the circumferential edge of the vehicle body opening. The mount base of the die-molded portion includes a bottom in a shape of a plate extending along the periphery of the door. The bottom has a core removal slit for removing a core used to form an inner surface of the hollow seal of the die-molded portion. The core removal slit extends in a longitudinal direction of the die-molded portion and has a length set shorter than the length of the core in the same direction. The bottom includes a thick-walled portion at a portion adjacent to an edge of the core removal slit. The thick-walled portion is thicker than the other portions of the bottom.

That is, a molding die that is opened and closed, for example, and the core are used in molding the die-molded portion integral with the extrusion-molded portion formed in advance. The molding die forms the outer surfaces of the mount base and hollow seal of the die-molded portion, while the core forms the inner surface of the hollow seal of the die-molded portion. After forming the die-molded portion, the core is removed through the core removal slit. At this moment, the die-molded portion needs to be stretched longitudinally, since the core removal slit is set shorter than the core in the same direction. Thus, the edge of the core removal slit tightly comes into elastic contact with the edge of the core and is stretched. However, the configuration of the present disclosure provides the thick-walled portion at a portion adjacent to the edge of the core removal slit, which reduces breakage of the edge of the core removal slit.

According to a second aspect of the present disclosure, the thick-walled portion may include an inclined surface with an increasing thickness toward the edge of the core removal slit. Thus, the core is less likely to be caught in the thick-walled portion at the time of removing the core through the core removal slit.

According to a third aspect of the present disclosure, the bottom may have a clip attachment hole between a connected portion where the bottom is connected to the extrusion-molded portion and the edge of the core removal slit. The clip attachment hole is a hole to which a clip configured to engage with the periphery of the door is attachable. This configuration allows securing of a desired part of the mount base of the die-molded portion to the periphery of the door. In order to provide the clip attachment hole in the bottom of the die-molded portion, the core removal slit needs to be shortened. As a result, the edge of the core removal slit more tightly comes into elastic contact with the edge of the core and is more stretched at the time of removing the core through the core removal slit. Even in such a case, the thick-walled portion reduces breakage of the edge of the core removal slit.

According to a fourth aspect of the present disclosure, the thick-walled portion may protrude toward an opposite side from a contact side of the bottom with the periphery of the door. With this configuration, the contact side of the bottom with the periphery of the door can be flattened into a shape along the outer peripheral surface of the door, which improves the sealing properties.

According to a fifth aspect of the present disclosure, the thick-walled portion may be in a shape of a ridge extending continuously in an inward-outward direction of a passenger compartment. This configuration further increases the effect of reinforcing the edge of the core removal slit.

As described above, a thick-walled portion provided at a portion adjacent to an edge of the core removal slit in the bottom of the die-molded portion can reduce breakage of the edge of the core removal slit at the time of removing the core after molding.

DETAILED DESCRIPTION

An embodiment of the present disclosure will now be described in detail with reference to the drawings. The following description of an advantageous embodiment is only an example in nature, and is not intended to limit the scope, applications or use of the present disclosure.

Figure 1:
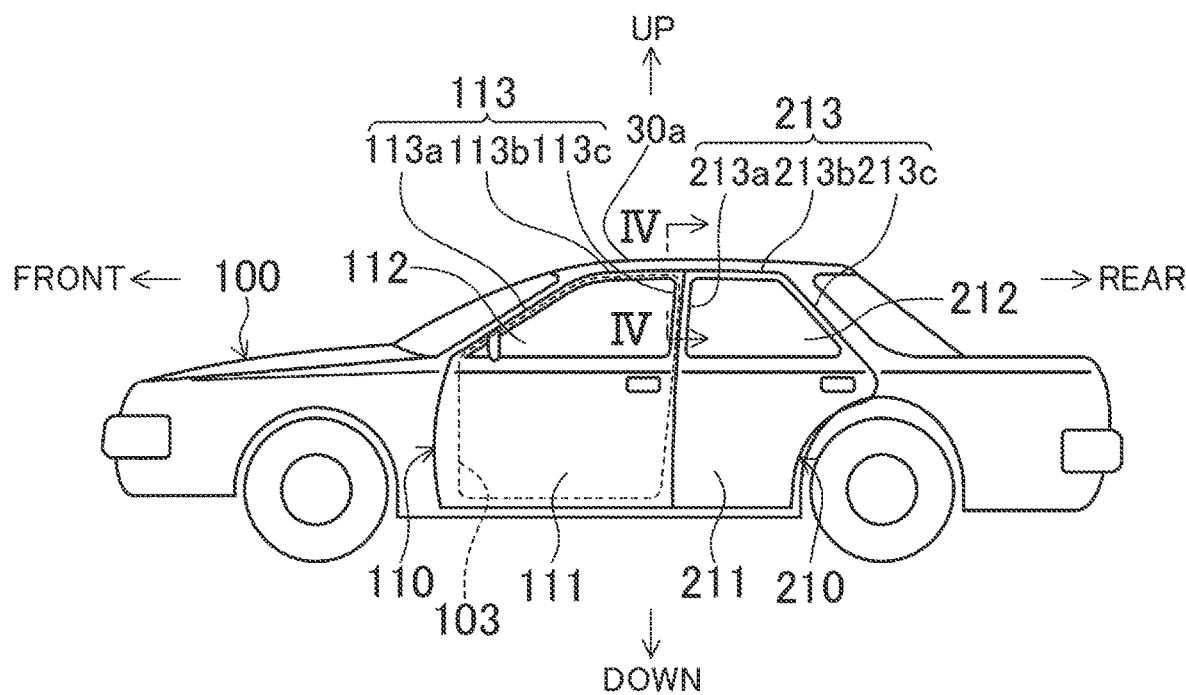
FIG. 1 is a left side view of an automobile including an automobile weather strip according to an embodiment of present disclosure.

FIG. 1 is a left side view of an automobile 100 including an automobile weather strip 1 (shown in FIG. 2) according to an embodiment of present disclosure. The automobile 100 has a front door 110 and a rear door 210, which are attached to both right and left sides and can be opened and closed. The front door 110 includes a door body 111, a windshield 112, and a window frame 113 functioning as a sash that holds the windshield 112. The door body 111 of the front door 110 is attached to a front pillar (not shown) of the vehicle body via hinges (not shown) pivotable about a pivot axis extending in the vertical direction. Like the front door 110, the rear door 210 includes a door body 211, a rear windshield 212, and a window frame 213 functioning as a sash that holds the rear windshield 212. The door body 211 is attached to a center pillar (not shown) via hinges (not shown) pivotable about a pivot axis extending in the vertical direction.

Note that in the description of this embodiment, the front side of a vehicle is simply referred to as the "front," and the rear side of a vehicle is simply referred to as the "rear." In addition, the outside in the transverse direction of the vehicle is referred to as the "outside of the passenger compartment," and the inside in the transverse direction of the vehicle is referred to as the "inside of the passenger compartment."

The window frame 113 of the front door 110 includes a front vertical side 113a, an upper side 113b, and a rear vertical side 113c. The front vertical side 113a of the frame extends upward and rearward from the upper front end of the door body 111. The upper side 113b of the frame extends rearward from the upper end of the front vertical side 113a of the frame. The rear vertical side 113c of the frame extends downward from the rear end (i.e., the longitudinal end) of the upper side 113b of the frame to the upper rear end of the door body 111.

The window frame 213 of the rear door 210 includes a front vertical side 213a, an upper side 213b, and a rear vertical side 213c. The front vertical side 213a of the frame extends upward from the upper front end of the door body 211. The upper side 213*b* of the frame extends rearward from the upper end of the front vertical side 213*a* of the frame. The rear vertical side 213*c* of the frame extends downward and rearward from the rear end (i.e., the longitudinal end) of the upper side 213*b* of the frame to the upper rear end of the door body 211.

(Overall Configuration of Front Door Weather Strip 1)

Figure 2:
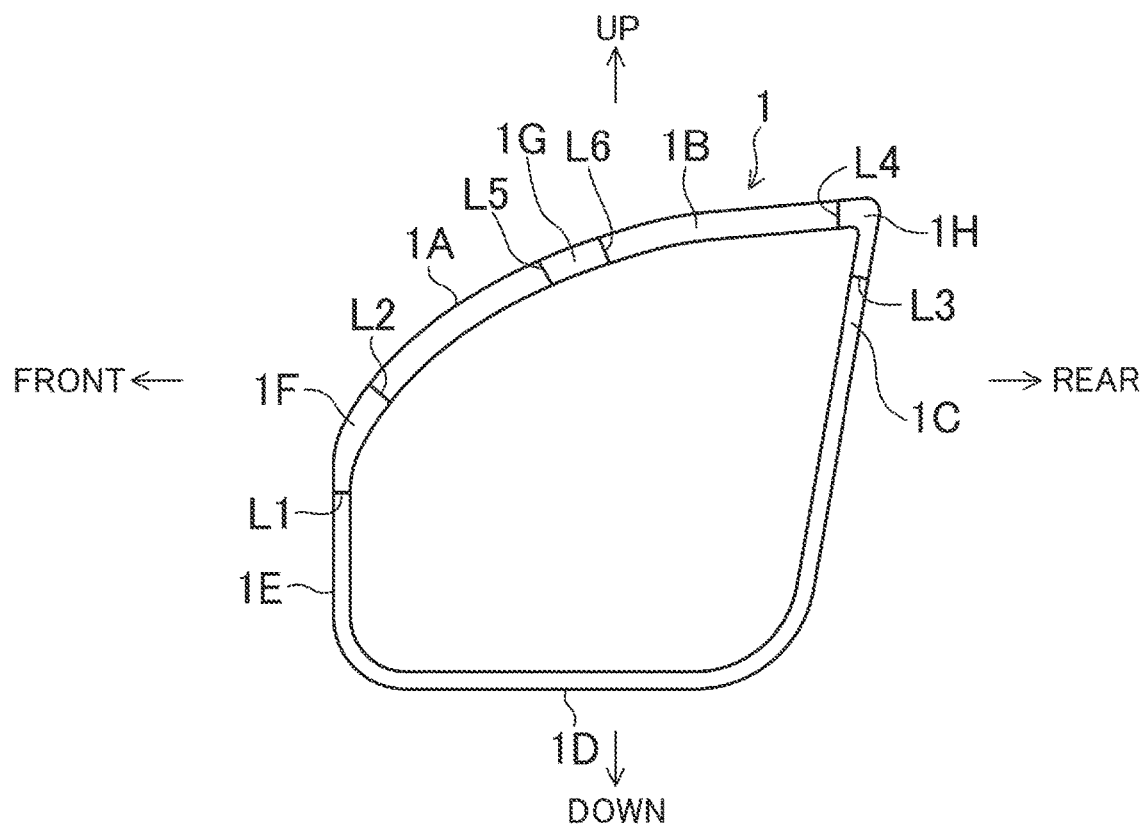
FIG. 2 is a side view of a left front door weather strip as viewed from the outside of the passenger compartment.

FIG. 2 shows a front door weather strip (automobile weather strip) 1. The front door weather strip 1 has an annular shape corresponding to the outer shape of the front door 110 and is attached to the periphery of the front door 110. The front door weather strip 1 is a member for sealing the gap between the circumferential edge of a vehicle body opening 103 (shown in FIG. 1) and the periphery of the front door 110.

The front door weather strip 1 includes a front upper side extrusion-molded portion 1A, a rear upper side extrusion-molded portion 1B, a rear vertical side extrusion-molded portion 1C, a lower side extrusion-molded portion 1D, and a front vertical side extrusion-molded portion 1E. Although the details of the molding method will be described later, the front upper side extrusion-molded portion 1A, the rear upper side extrusion-molded portion 1B, the rear vertical side extrusion-molded portion 1C, the lower side extrusion-molded portion 1D, and the front vertical side extrusion-molded portion 1E are obtained through extrusion molding in which an elastic material is extruded through an extrusion die (not shown) and molded so as to have the same cross-sectional shape in the longitudinal direction.

The front door weather strip 1 further includes: a front die-molded portion 1F between the front end of the front upper side extrusion-molded portion 1A and the upper end of the front vertical side extrusion-molded portion 1E; an intermediate die-molded portion 1G between the rear end of the front upper side extrusion-molded portion 1A and the front end of the rear upper side extrusion-molded portion 1B; and a rear die-molded portion 1H between the rear end of the rear upper side extrusion-molded portion 1B and the upper end of the rear vertical side extrusion-molded portion 1C.

A reference numeral L1 denotes the boundary between the front vertical side extrusion-molded portion 1E and the front die-molded portion 1F, whereas a reference numeral L2 denotes the boundary between the front upper side extrusion-molded portion 1A and the front die-molded portion 1F. The front die-molded portion 1F is connected to the upper end (i.e., the longitudinal end) of the front vertical side extrusion-molded portion 1E and the front end (i.e., the longitudinal end) of the front upper side extrusion-molded portion 1A. A reference numeral L3 denotes the boundary between the rear vertical side extrusion-molded portion 1C and the rear die-molded portion 1H, whereas a reference numeral L4 denotes the boundary between the rear upper side extrusion-molded portion 1B and the rear die-molded portion 1H. The rear die-molded portion 1H is connected to the rear end (i.e., the longitudinal end) of the rear upper side extrusion-molded portion 1B and the upper end (i.e., the longitudinal end) of the rear vertical side extrusion-molded portion 1C. A reference numeral L5 denotes the boundary between the front upper side extrusion-molded portion 1A and the intermediate die-molded portion 1G, whereas a reference numeral L6 denotes the boundary between the rear upper side extrusion-molded portion 1B and the intermediate die-molded portion 1G. The intermediate die-molded portion 1G is connected to the rear end (i.e., the longitudinal end) of the front upper side extrusion-molded portion 1A and the front end (i.e., the longitudinal end) of the rear upper side extrusion-molded portion 1B.

The front die-molded portion 1F, the intermediate die-molded portion 1G, and the rear die-molded portion 1H are molded by a molding die that can be opened and closed, which will be described later. The front die-molded portion 1F is obtained by injecting an elastic material into the cavity of the molding die holding the front end of the front upper side extrusion-molded portion 1A and the upper end of the front vertical side extrusion-molded portion 1E. Accordingly, the front die-molded portion 1F is integrally molded with the front end of the front upper side extrusion-molded portion 1A and the upper end of the front vertical side extrusion-molded portion 1E. The intermediate die-molded portion 1G is obtained by injecting an elastic material into the cavity of the molding die holding the rear end of the front upper side extrusion-molded portion 1A and the front end of the rear upper side extrusion-molded portion 1B. Accordingly, the intermediate die-molded portion 1G is integrally molded with the front upper side extrusion-molded portion 1A and the rear upper side extrusion-molded portion 1B. The rear die-molded portion 1H is obtained by injecting an elastic material into the cavity of the molding die holding the rear end of the rear upper side extrusion-molded portion 1B and the upper end of the rear vertical side extrusion-molded portion 1C. Accordingly, the rear die-molded portion 1H is integrally molded with the rear upper side extrusion-molded portion 1B and the rear vertical side extrusion-molded portion 1C. For example, the rear upper side extrusion-molded portion 1B and the rear die-molded portion 1H are provided for a section of the window frame 113 including the upper side 113*b* and the rear vertical side 113*c* extending downward from the rear end of the upper side 113*b*.

On the other hand, the front upper side extrusion-molded portion 1A, the front die-molded portion 1F, and the front vertical side extrusion-molded portion 1E are provided for a section of the window frame 113 including the front vertical side 113*a* and a front portion of the door body 111.

The material applicable to the front door weather strip 1 is not particularly limited as long as the material is a rubber-like elastic material. If the material is rubber, EPDM sponge rubber is preferable. If the material is a thermoplastic resin, foamed TPO or soft TPO is preferable.

Now, a case will be described where the present disclosure is applied to a section of the front door weather strip 1 extending from the front vertical side extrusion-molded portion 1E to the front die-molded portion 1F and the front upper side extrusion-molded portion 1A. The present disclosure is applicable not only to this section but also to other sections of the front door weather strip 1, or can be employed as a rear door weather strip (not shown) to be attached to the rear door 210.

Figure 3:
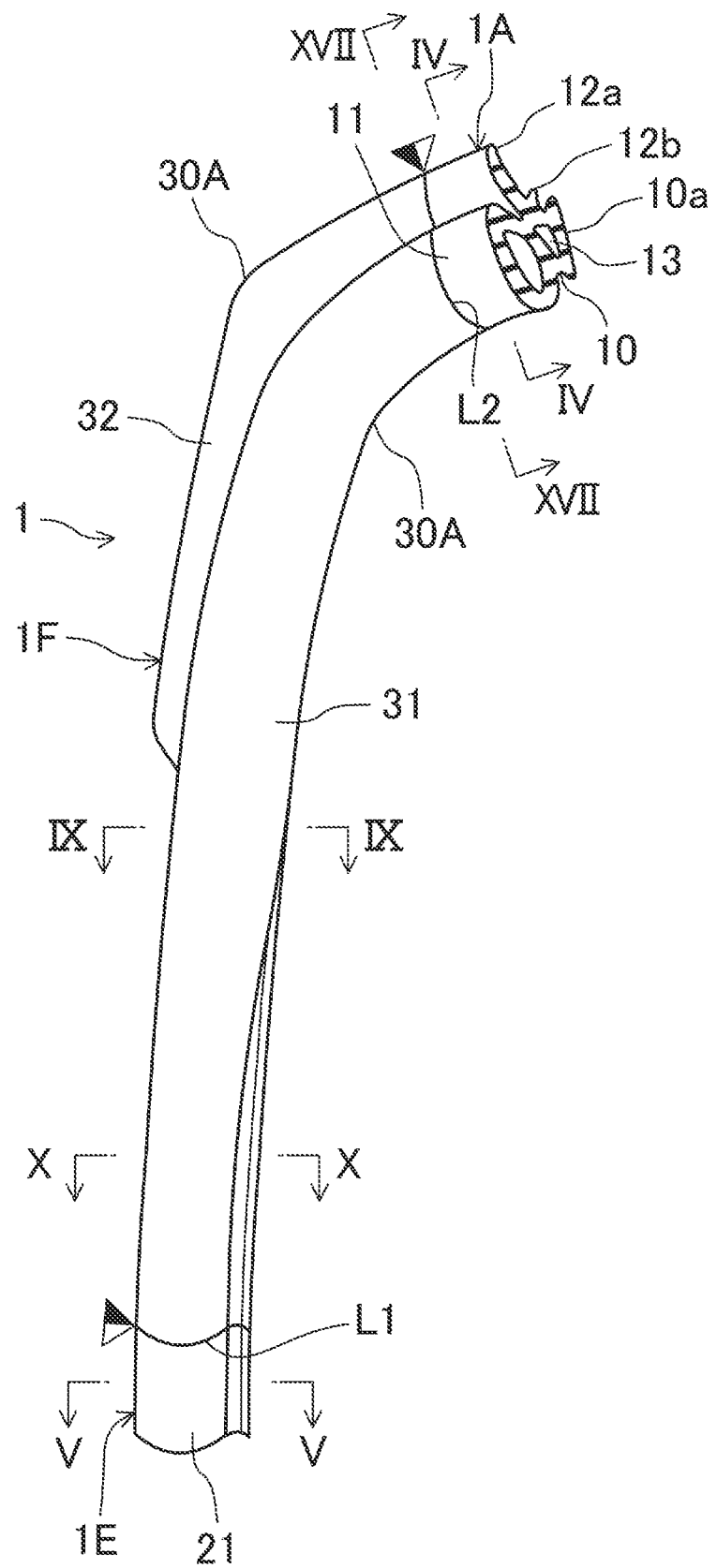
FIG. 3 is an enlarged perspective view of a section of the front door weather strip from a front vertical side extrusion-molded portion to a front die-molded portion and a front upper side extrusion-molded portion.
Figure 4:
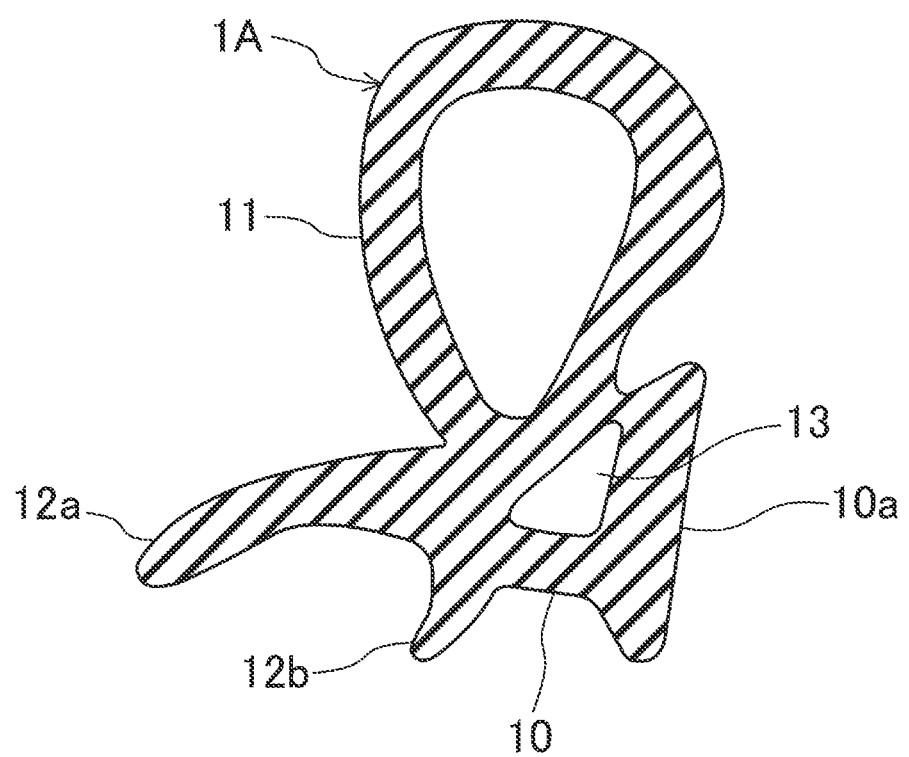
FIG. 4 is a cross-sectional view taken along line IV-IV in FIG. 3.

FIG. 3 is an enlarged perspective view of a section of the front door weather strip 1 from the front vertical side extrusion-molded portion 1E to the front die-molded portion 1F and the front upper side extrusion-molded portion 1A. As shown in FIG. 4 as well, the front upper side extrusion-molded portion 1A includes: a mount base 10 to be mounted on the periphery of the front door 110; a hollow seal 11 integrally molded with the mount base 10 and coming into elastic contact with the circumferential edge of the vehicle body opening 103; and first and second upper side lips 12*a* and 12*b*. The mount base 10 has a bottom 10*a* in the shape of a plate extending along the periphery of the front door 110. Although not shown, the front upper side extrusion-molded portion 1A is attachable to the periphery of the upper side 113*b* of the window frame 113 of the front door 110 with a resin clip. The clip is configured to engage with the periphery of the upper side 113b of the window frame 113 of the front door 110 and is attachable to the bottom 10a.

Although not shown, the window frame 113 may have a holder shape, into which the bottom 10a is fitted to be attached instead of using the clip.

The mount base 10 has a hollow shape and has an upper side hollow 13. The hollow seal 11 is a portion that comes into elastic contact with the circumferential edge of the vehicle body opening 103 when the front door 110 is closed. The first upper side lip 12a as well is a portion that comes into elastic contact with the circumferential edge of the vehicle body opening 103 when the front door 110 is closed. The second upper side lip 12b is a portion that comes into elastic contact with the periphery of the upper side 113b of the window frame 113 of the front door 110.

Figure 5:
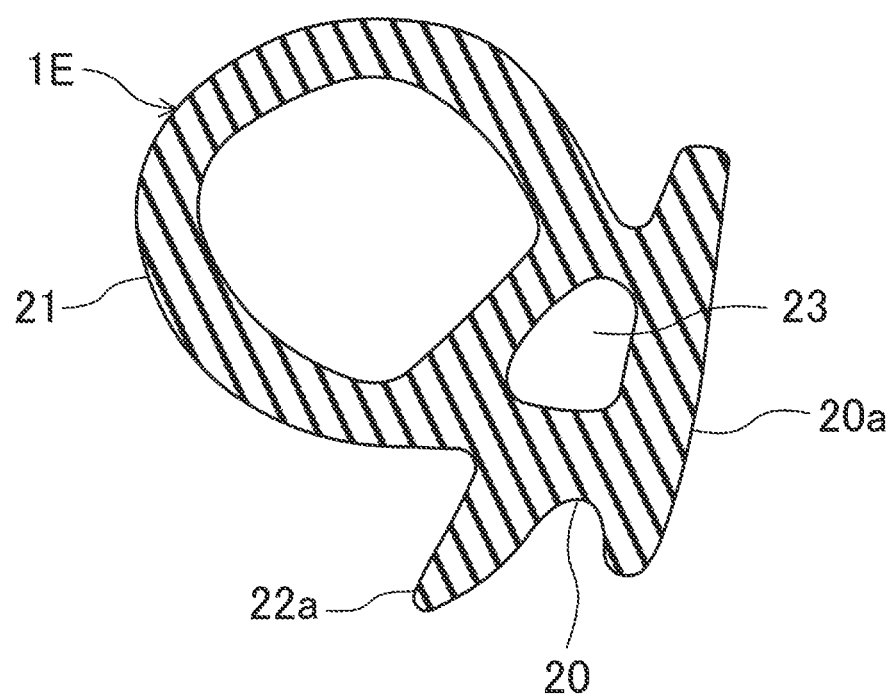
FIG. 5 is a cross-sectional view taken along line V-V in FIG. 3.

As shown in FIG. 5, the front vertical side extrusion-molded portion 1E includes: a mount base 20 to be mounted on the periphery of the front door 110; a hollow seal 21 integrally molded with the mount base 20 and coming into elastic contact with the circumferential edge of the vehicle body opening 103; and a vertical side lip 22a. The vertical side lip 22a is a portion that comes into elastic contact with the door body 111 of the front door 110.

The mount base 20 has a bottom 20a in the shape of a plate extending along the periphery of the front door 110. Although not shown, the front vertical side extrusion-molded portion 1E is attachable to the periphery of the door body 111 of the front door 110 with a resin clip. The clip is configured to engage with the periphery of the door body 111 of the front door 110 and is attachable to the bottom 20a. The mount base 20 has a hollow shape and has a vertical side hollow 23. The hollow seal 21 is a portion that comes into elastic contact with the circumferential edge of the vehicle body opening 103 when the front door 110 is closed. The vertical side lip 22a is a portion that comes into elastic contact with the periphery of the door body 111 of the front door 110.

Figure 6:
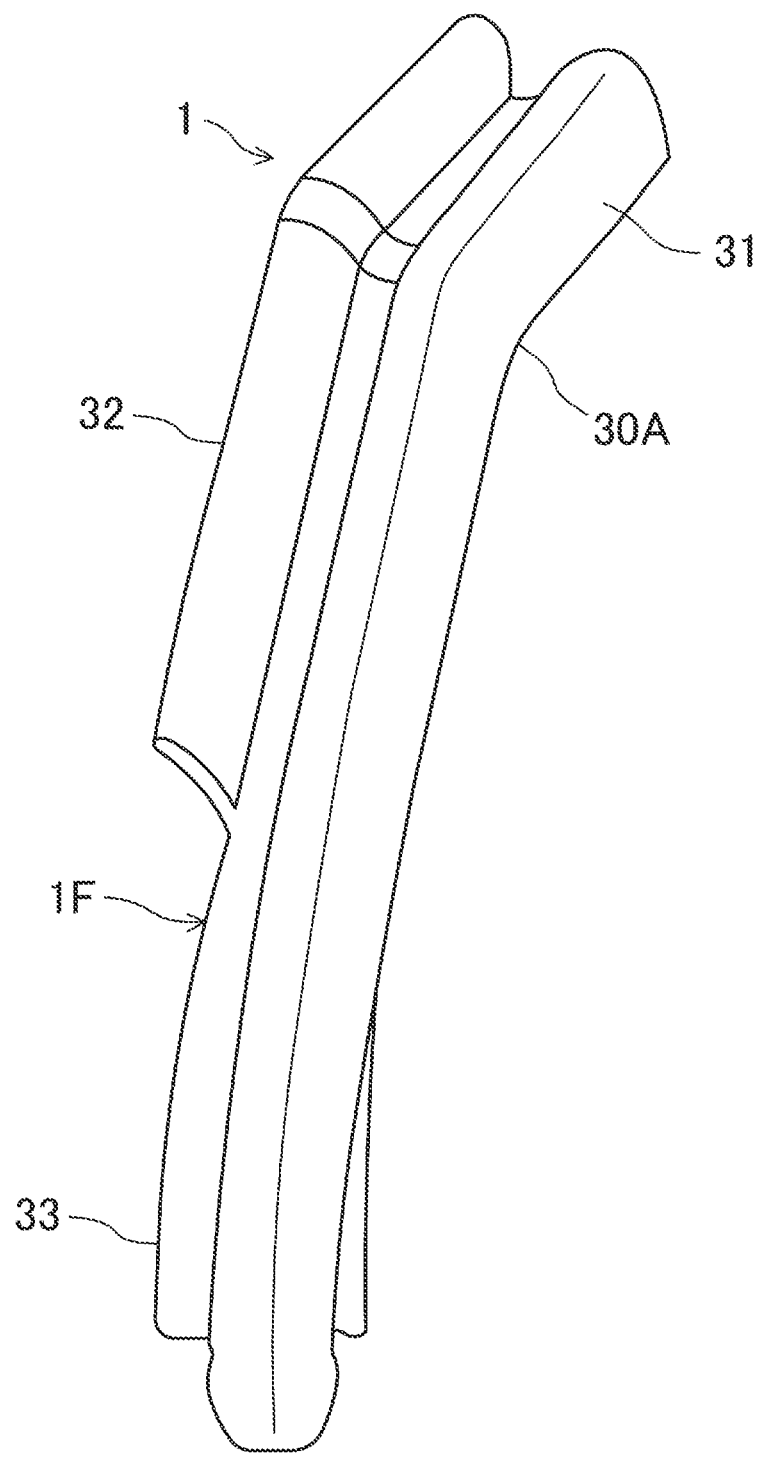
FIG. 6 is a perspective view of the front die-molded portion as viewed from the front.
Figure 7:
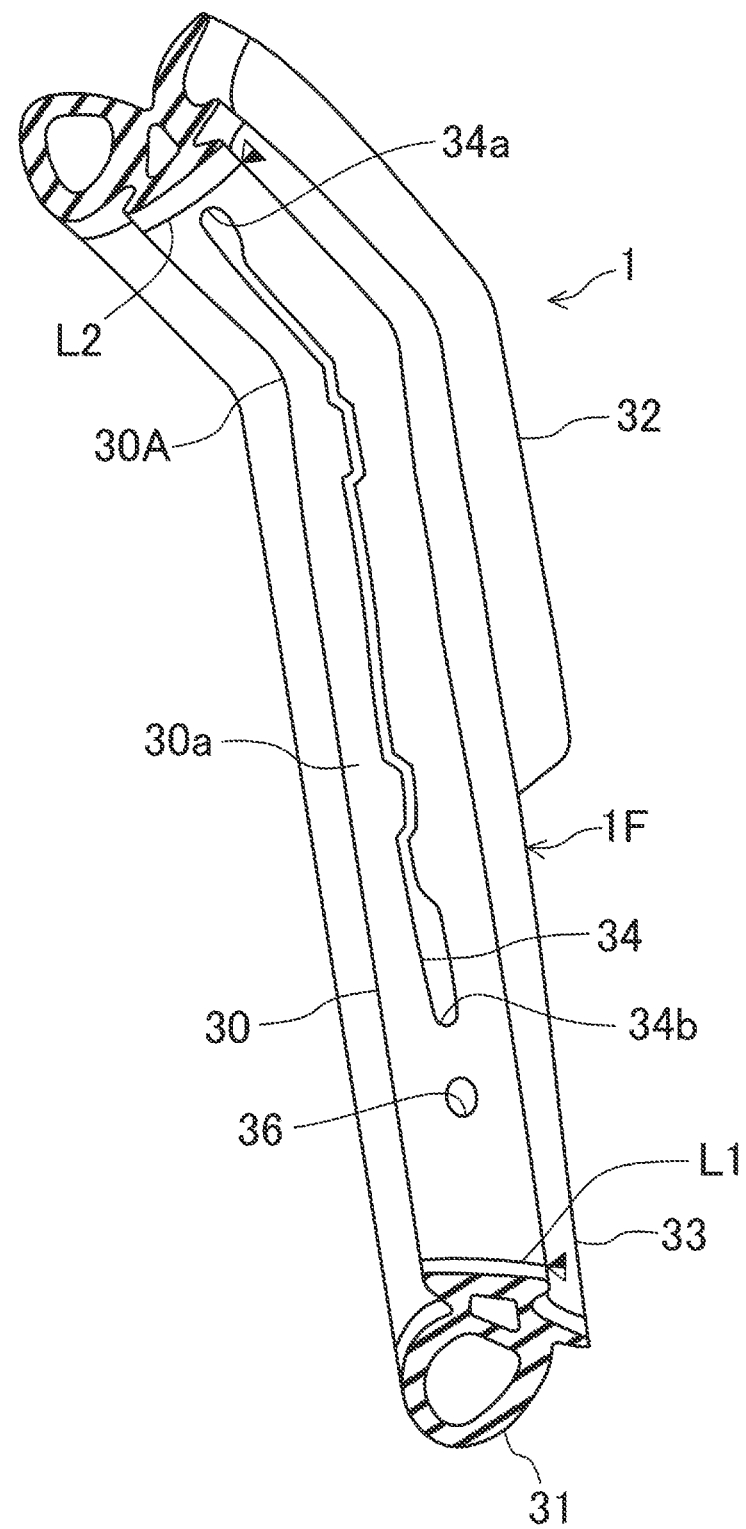
FIG. 7 is a perspective view of the front die-molded portion as viewed obliquely from the lower rear.

As shown in FIGS. 3, 6, and 7, the front die-molded portion 1F has a bent portion 30A at a vertically intermediate portion. That is, the section of the front die-molded portion 1F below the bent portion 30A extends vertically, whereas the section of the front die-molded portion 1F above the bent portion 30A extends rearward toward the top. The bent portion 30A is closer to the top than the vertical center of the front die-molded portion 1F. Accordingly, the section of the front die-molded portion 1F below the bent portion 30A is longer than the section of the front die-molded portion 1F above the bent portion 30A. The bent portion 30A may be omitted and replaced with a curved portion (not shown), or the front die-molded portion 1F may be linear.

As shown in FIGS. 3, 8 to 10, and 17, the front die-molded portion 1F includes: a mount base 30 to be mounted on the periphery of the front door 110; a hollow seal 31 integrally molded with the mount base 30 and coming into elastic contact with the circumferential edge of the vehicle body opening 103; and first and second lips 32 and 33. The mount base 30, the hollow seal 31 and the first and second lips 32 and 33 are bent at the position of the bent portion 30A.

The mount base 30 has a bottom 30a in the shape of a plate extending along the periphery of the front door 110. The upper end of the bottom 30a is connected to the front end of the bottom 10a of the front upper side extrusion-molded portion 1A. The lower end of the bottom 30a is connected to the upper end of the bottom 20a of the front vertical side extrusion-molded portion 1E.

The hollow seal 31 is a portion that comes into elastic contact with the circumferential edge of the vehicle body opening 103 when the front door 110 is closed. The upper end of the hollow seal 31 is connected to the front end of the hollow seal 11 of the front upper side extrusion-molded portion 1A. The lower end of the hollow seal 31 is connected to the upper end of the hollow seal 21 of the front vertical side extrusion-molded portion 1E. Accordingly, the internal space of the hollow seal 31 communicates with the internal space of the hollow seal 11 and the internal space of the hollow seal 21.

The upper end of the first lip 32 is continuous with the front end of the first upper side lip 12a of the front upper side extrusion-molded portion 1A. The lower end of the first lip 32 is located at a vertically intermediate point of the front die-molded portion 1F (shown in FIG. 6). The second lip 33 is smaller than the first lip 32.

Figure 8:
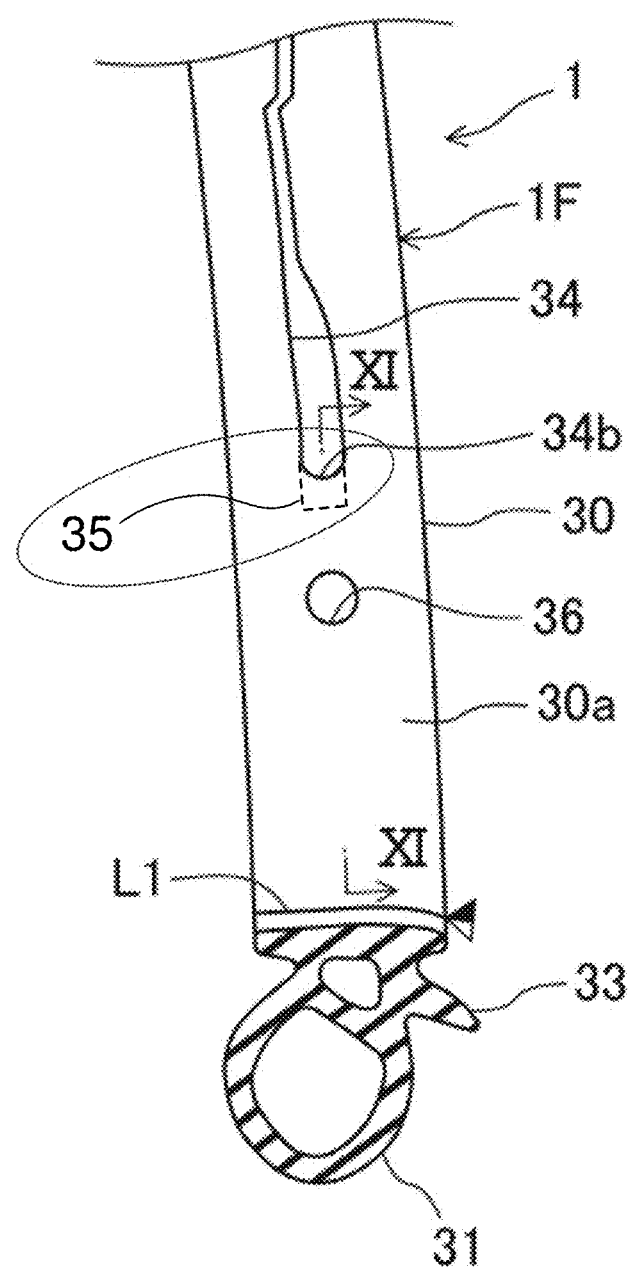
FIG. 8 is a rear view of a lower portion of the front die-molded portion.
Figure 9:
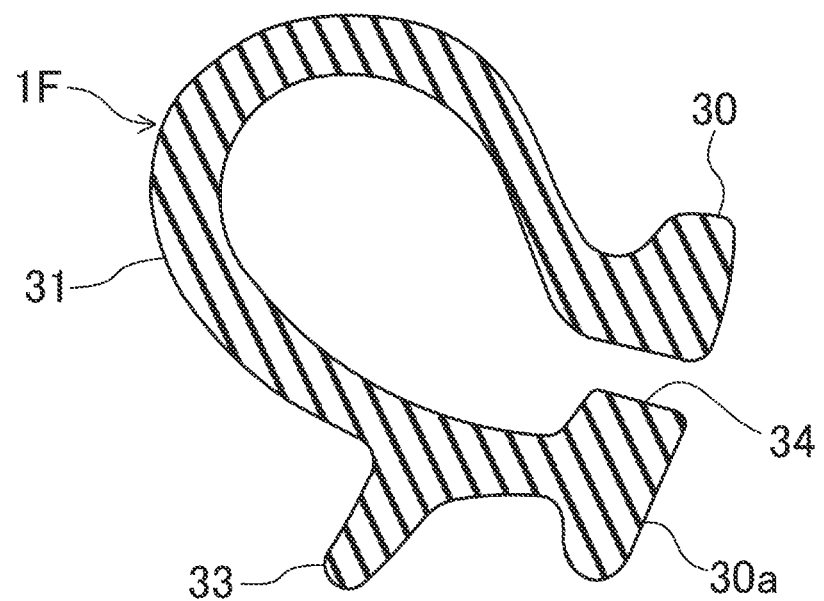
FIG. 9 is a cross-sectional view taken along line IX-IX in FIG. 3.

As shown in FIGS. 7 to 9, the bottom 30a has a core removal slit 34 for removing a core 300 (which will be described later) used to form the inner surface of the hollow seal 31. The core removal slit 34 extends along the length of the front die-molded portion 1F. Since the bottom 30a extends vertically, the core removal slit 34 in the bottom 30a also extends vertically. As shown in FIG. 7, the upper edge 34a of the core removal slit 34 is near the upper end of the front die-molded portion 1F. On the other hand, the lower edge 34b of the core removal slit 34 is located above and apart from the lower end of the front die-molded portion 1F.

Figure 11:
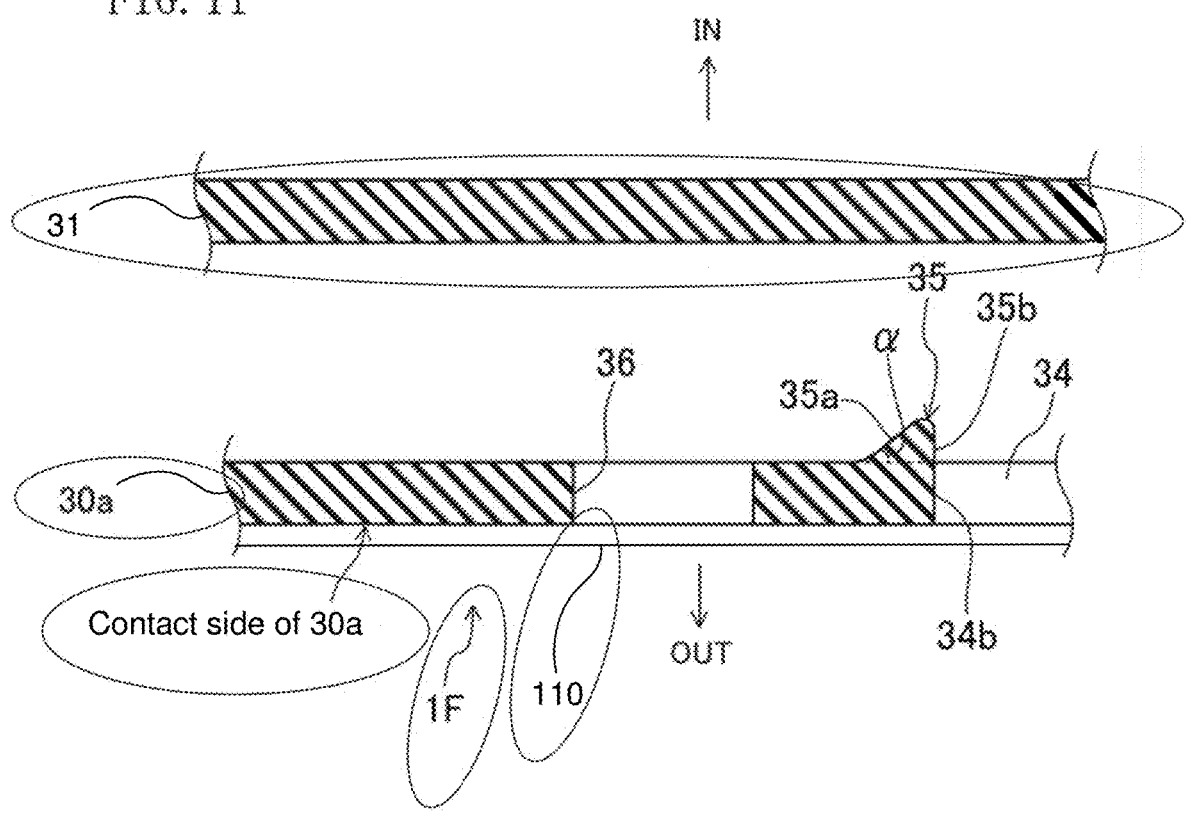
FIG. 11 is a cross-sectional view taken along line XI-XI in FIG. 8.

As shown in FIGS. 7, 8 and 11, the bottom 30a includes a thick-walled portion 35 below and adjacent to the lower edge 34b of the core removal slit 34. The thick-walled portion is thicker than the other portions of the bottom 30a. The thick-walled portion 35 is formed by a recess 304 of the core 300 which will be described later. The thick-walled portion 35 is a reinforcement of the lower edge 34b of the core removal slit 34 and protrudes toward an opposite side (i.e., inward) from the contact side of the bottom 30a with the periphery of the front door 110. That is, the surface present outside the bottom 30a serves as a surface that comes into contact with the periphery of the front door 110, while the surface present inside the bottom 30a is a surface that does not come into contact with the periphery of the front door 110. Since the thick-walled portion 35 is on the surface present inside the bottom 30a, the contact side of the bottom 30a with the periphery of the front door 110 can be flattened into a shape along the outer peripheral surface of the front door 110, which improves the sealing properties.

The thick-walled portion 35 is in a shape of a ridge extending continuously in the inward-outward direction of the passenger compartment. The thick-walled portion 35 has an inclined surface 35a with an increasing thickness toward the lower edge 34b of the core removal slit 34. On the other hand, the thick-walled portion 35 has a surface 35b located toward the core removal slit 34. The surface 35b extends along the thickness of the bottom 30a. This configuration further increases the effect of the thick-walled portion 35 reinforcing the lower edge 34b of the core removal slit 34. The thick-walled portion 35 may be in the shape of a ridge extending along the lower edge 34b of the core removal slit 34.

The thick-walled portion 35 has a thickness ranging from 1.3 times to 2.0 times the thicknesses of the other portions of the bottom 30a. A thickness less than 1.3 times provides insufficient rigidity and tends to cause breakage at the upper edge 34a or the lower edge 34b at the time of removing the core 300 through the core removal slit 34. A thickness over 2.0 times tends to cause the core 300 to be caught in the thick-walled portion 35 at the time of removing the core 300 through the core removal slit 34.

The inclined surface 35a of the thick-walled portion 35 and the surface present inside the bottom 30a form an angle α set within a range of from 15 degrees to 60 degrees. An angle less than 15 degrees makes the section of the thick-walled portion 35 where thickness gradually changes unnecessarily long, which is not preferable. An angle over 60 degrees tends to cause the core 300 to be caught in the thick-walled portion 35 at the time of removing the core 300 through the core removal slit 34.

Figure 12:
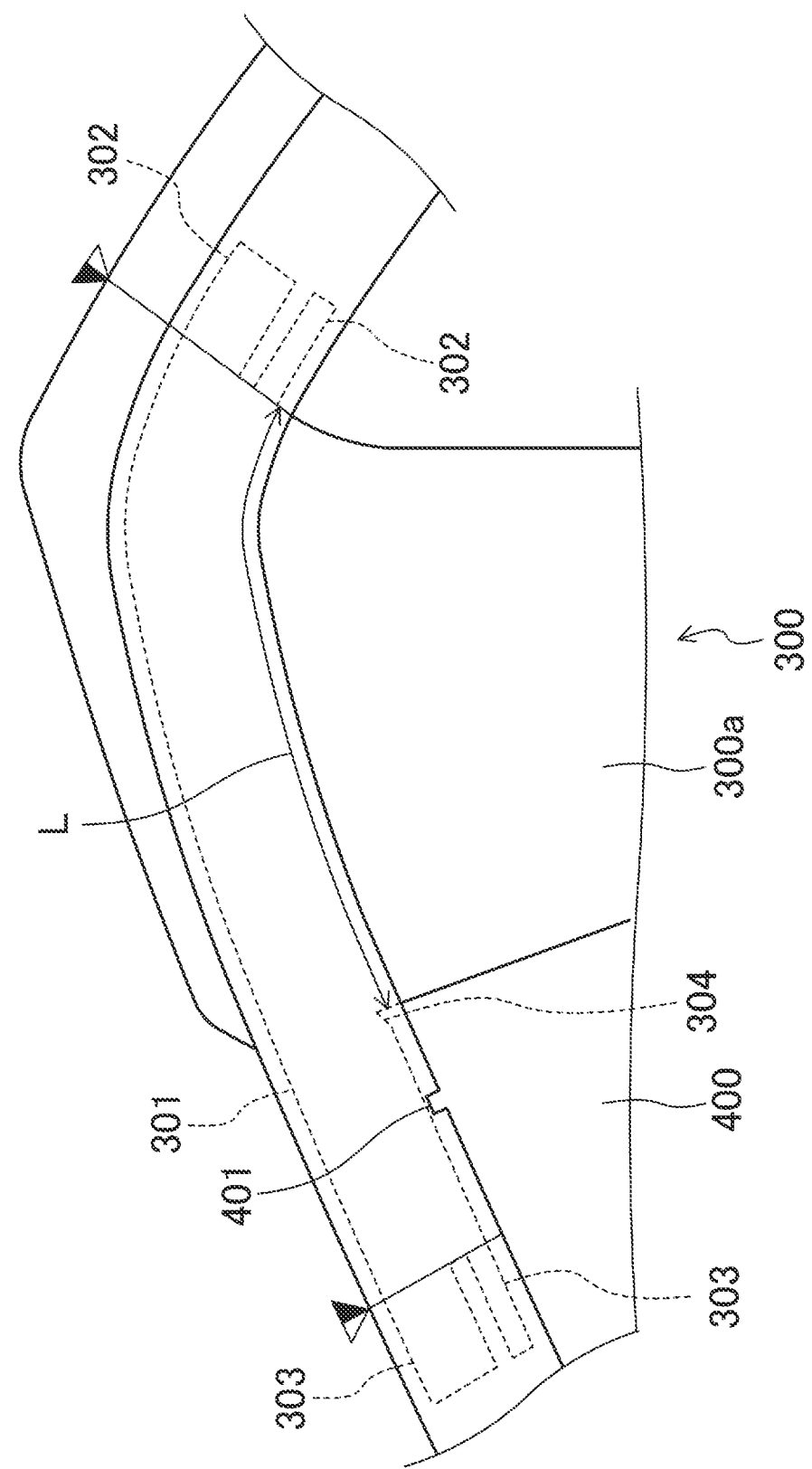
FIG. 12 is a diagram showing a state immediately after molding the front die-molded portion.

As shown in FIG. 12, the core 300 includes a forming portion 301 and first and second insertion portions 302 and 303. The forming portion 301 is used to form the inner surface of the hollow seal 31 of the front die-molded portion 1F. The first insertion portion 302 protrudes from the forming portion 301 and is inserted into the hollow seal 11 and the upper side hollow 13 of the front upper side extrusion-molded portion 1A. The second insertion portion 303 protrudes from the forming portion 301 and is inserted into the hollow seal 21 and the vertical side hollow 23 of the front vertical side extrusion-molded portion 1E.

A core support plate 300a is also provided which protrudes from the forming portion 301 so as to support the forming portion 301 itself inside the molding die cavity. The portion in the bottom 30a where the core support plate 300a is present forms the shape of the core removal slit 34 shown in FIGS. 7, 9, and 17.

As shown in FIG. 12, the core removal slit 34 has a length L, which is set to be shorter than the length of the core 300 in the same direction. The length of the core 300 is the total length of the forming portion 301 and the first and insertion portions 302 and 303.

Figure 10:
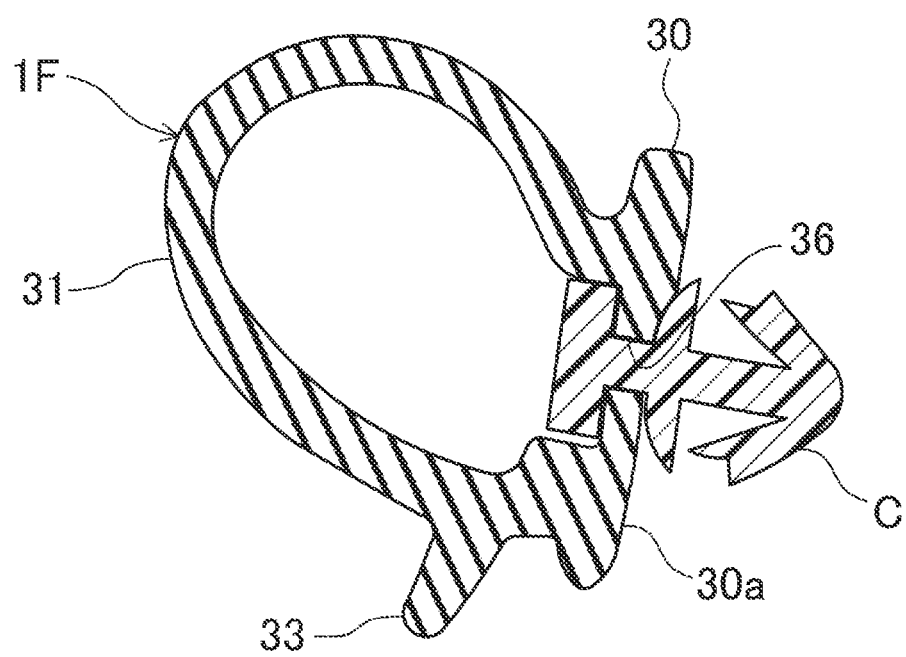
FIG. 10 is a cross-sectional view taken along line X-X in FIG. 3.

As shown in FIG. 10, the bottom 30a has a clip attachment hole 36 between a connected portion where the bottom 30a is connected to the front vertical side extrusion-molded portion 1E (i.e., the portion indicated by the boundary L1) and the lower edge 34b of the core removal slit 34. The clip attachment hole 36 is a hole to which a clip C configured to engage with the periphery of the door body 111 of the front door 110 is attachable. The clip attachment hole 36 is formed by a protrusion 401 of a slidable mold 400 which will be described later.

Specifically, the door body 111 of the front door 110 has, on its periphery, an insertion hole (not shown) into which the distal end of the clip C is to be inserted. The distal end of the clip C is inserted into the insertion hole, and the clip C engages with the circumferential edge of the insertion hole and does not come off. It is thus possible to secure the bottom 30a to the periphery of the front door 110. In FIG. 8, the clip attachment hole 36 is in a circular shape. However, the shape is not limited thereto and may be any shape as long as the clip C can be held and does not come off.

The bottom 30a may have a vent hole (not shown) between the connected portion where the bottom 30a is connected to the front vertical side extrusion-molded portion 1E and the clip attachment hole 36. That is, the bottom 30a may have the core removal slit 34, the clip attachment hole 36, and additionally the vent hole (not shown) arranged sequentially from the top. The vent hole is for reducing the sticking of the core 300 to the inner surface of the hollow seal 31 by taking air from the outside at the time of removing the core 300 from the hollow seal 31. The shape of the vent hole is not particularly limited and may be a vertically long shape.

(How to Form Front Die-Molded Portion)

Next, how to form the front die-molded portion 1F will be described. After the front vertical side extrusion-molded portion 1E and the front upper side extrusion-molded portion 1A are prepared, the front vertical side extrusion-molded portion 1E and the front upper side extrusion-molded portion 1A are held in a molding die (not shown) for forming the front die-molded portion 1F. This molding die includes the core 300 as shown, for example, in FIG. 12. The first insertion portion 302 of the core 300 is inserted into the hollow seal 11 and the upper side hollow 13 of the front upper side extrusion-molded portion 1A. The second insertion portion 303 is inserted into the hollow seal 21 and the vertical side hollow 23 of the front vertical side extrusion-molded portion 1E.

Here, the core 300 has the recess 304 on the side closer to the second insertion portion 303 at the portion where the core support plate 300a and the forming portion 301 are connected together. The slidable mold 400 is placed on the side of the core 300 adjacent to the hollow seal 21 of the front vertical side extrusion-molded portion 1E. The slidable mold 400 has a columnar protrusion 401 which is in contact with the forming portion 301 of the core 300 when the molding die is fully closed.

After that, the molding die is filled with a material for the front die-molded portion 1F, and the material is molded by the molding die and the core 300. As a result, the front die-molded portion 1F continuous with the front vertical side extrusion-molded portion 1E and the front upper side extrusion-molded portion 1A is obtained as shown in FIG. 12. At the same time, the thick-walled portion 35 shown in FIG. 11 is formed by the recess 304, and the clip attachment hole 36 shown, for example, in FIG. 10 is formed by the protrusion 401.

Figure 13:
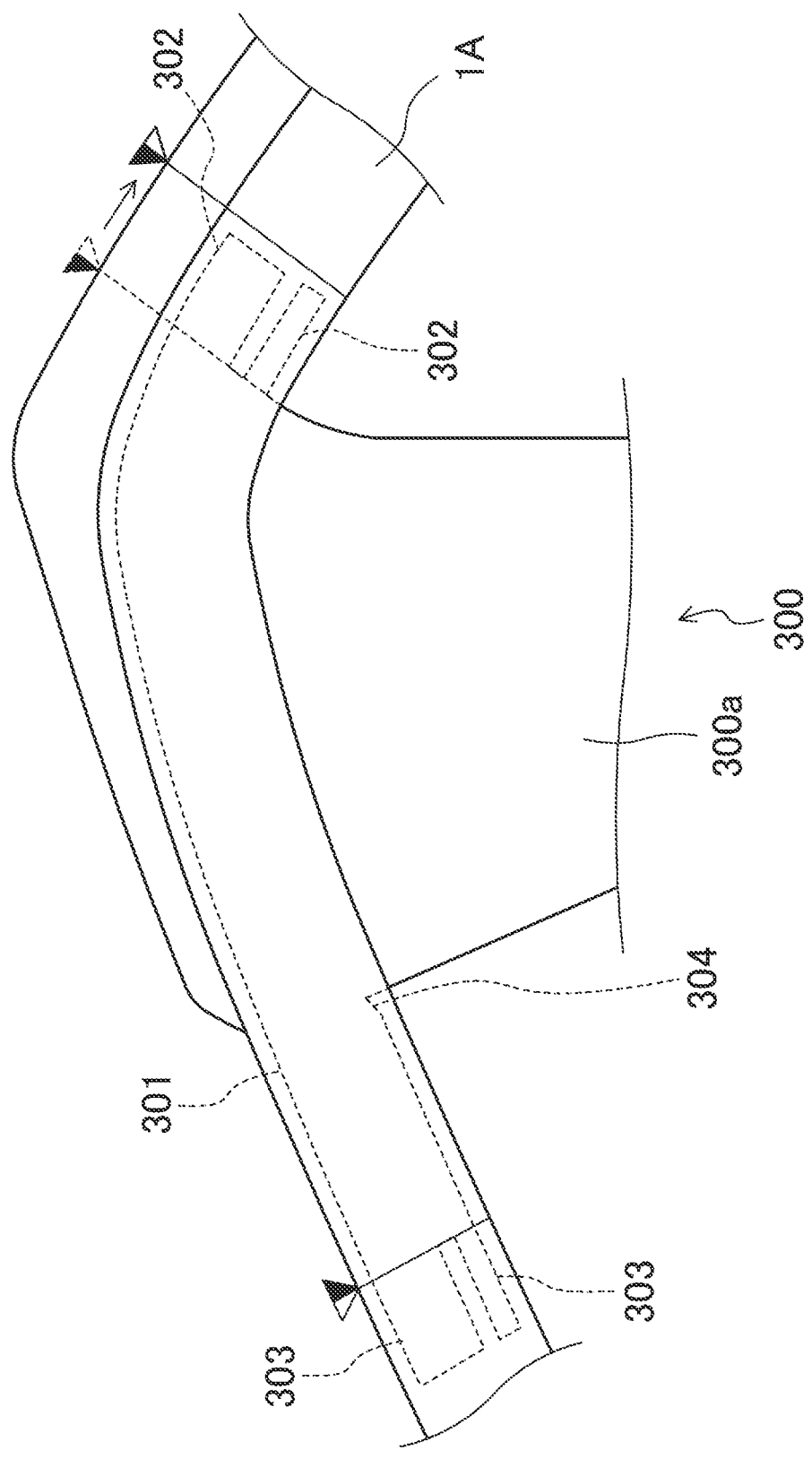
FIG. 13 is a diagram corresponding to FIG. 12 and showing a state in which an upper portion of the front die-molded portion is pulled.

Next, after opening the upper part (not shown) of the molding die and retracting the slidable mold 400, the core 300 is removed. First, as shown in FIG. 13, the front die-molded portion 1F is pulled toward the front upper side extrusion-molded portion 1A (in the arrow direction) to stretch as a whole. At this moment, the lower edge 34b of the core removal slit 34 tightly comes into elastic contact with the edge of the core support plate 300a and is stretched. However, the breakage of the lower edge 34b of the core removal slit 34 is reduced due to the thick-walled portion 35 that is provided adjacent to the lower edge 34b of the core removal slit 34 and reinforces the lower edge 34b.

Figure 14:
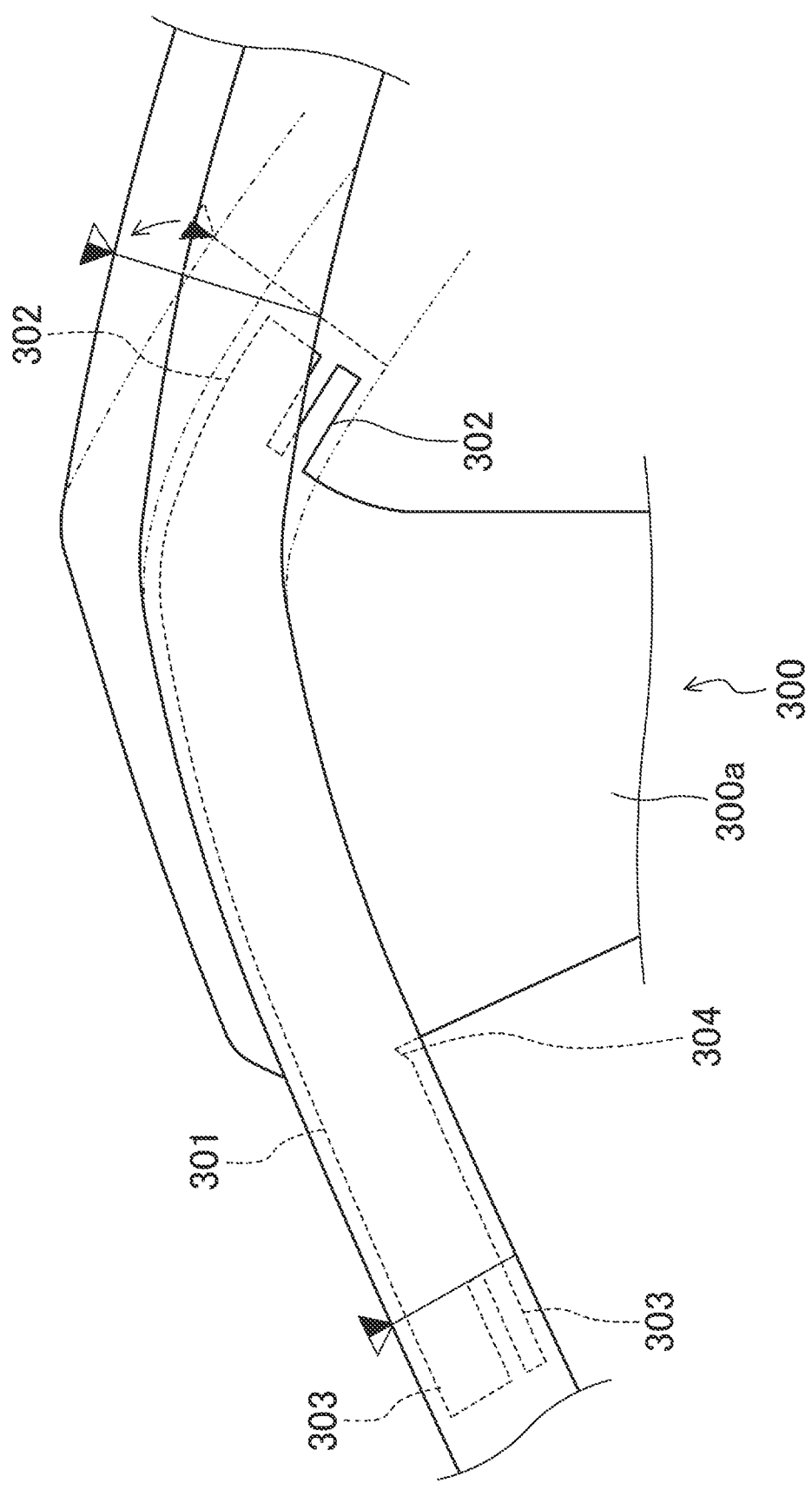
FIG. 14 is a diagram corresponding to FIG. 12 and showing a state in which the core is removed from the upper portion of the front die-molded portion.

Next, as shown in FIG. 14, with the front die-molded portion 1F stretched, the first insertion portion 302 is removed from the hollow seal 11 and the upper side hollow 13 of the front upper side extrusion-molded portion 1A, and from the upper edge 34a of the core removal slit 34 (in the arrow direction).

Figure 15:
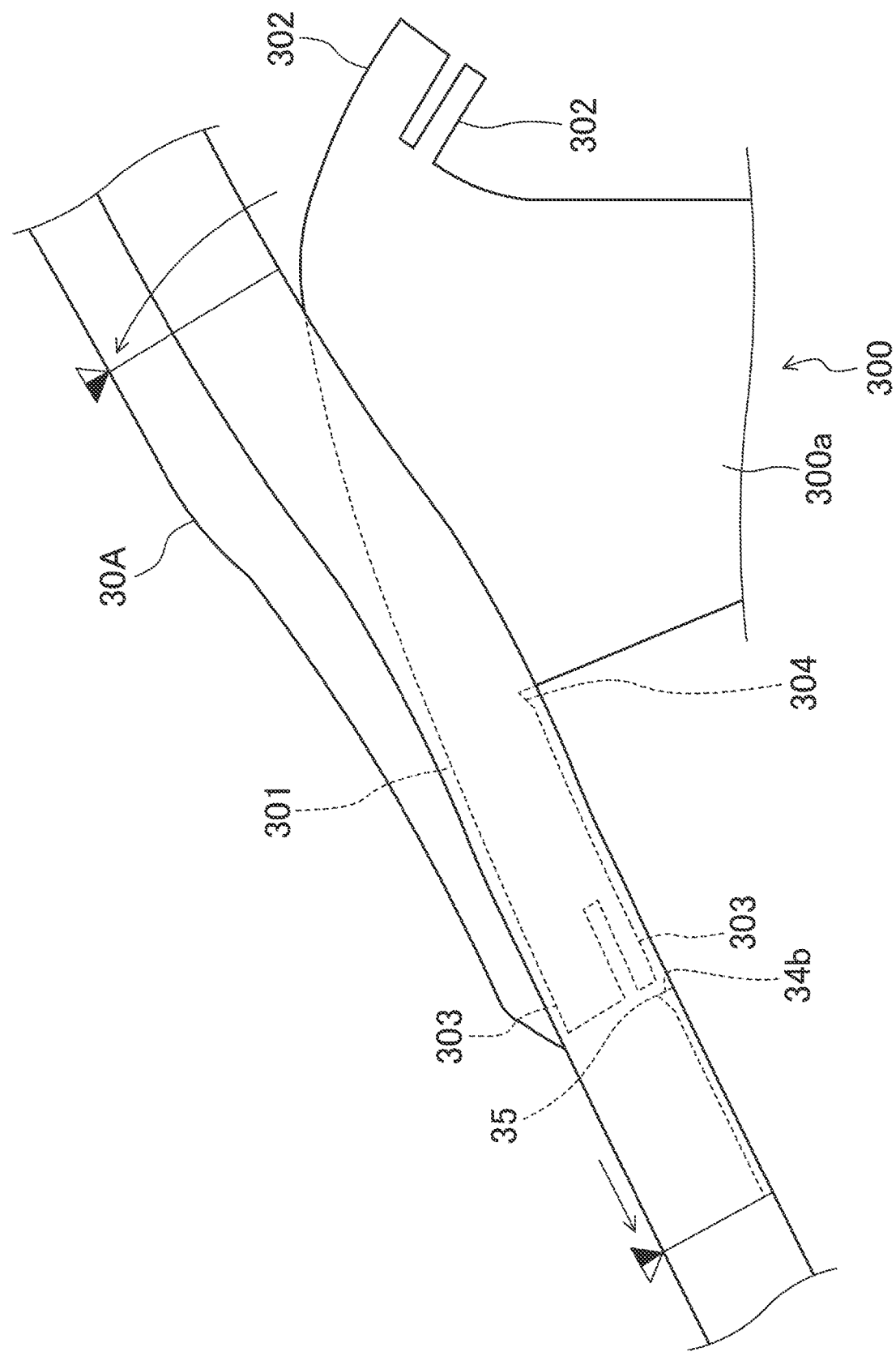
FIG. 15 is a diagram corresponding to FIG. 12 and showing a state in which the core is removed from an intermediate portion of the front die-molded portion.
Figure 16:
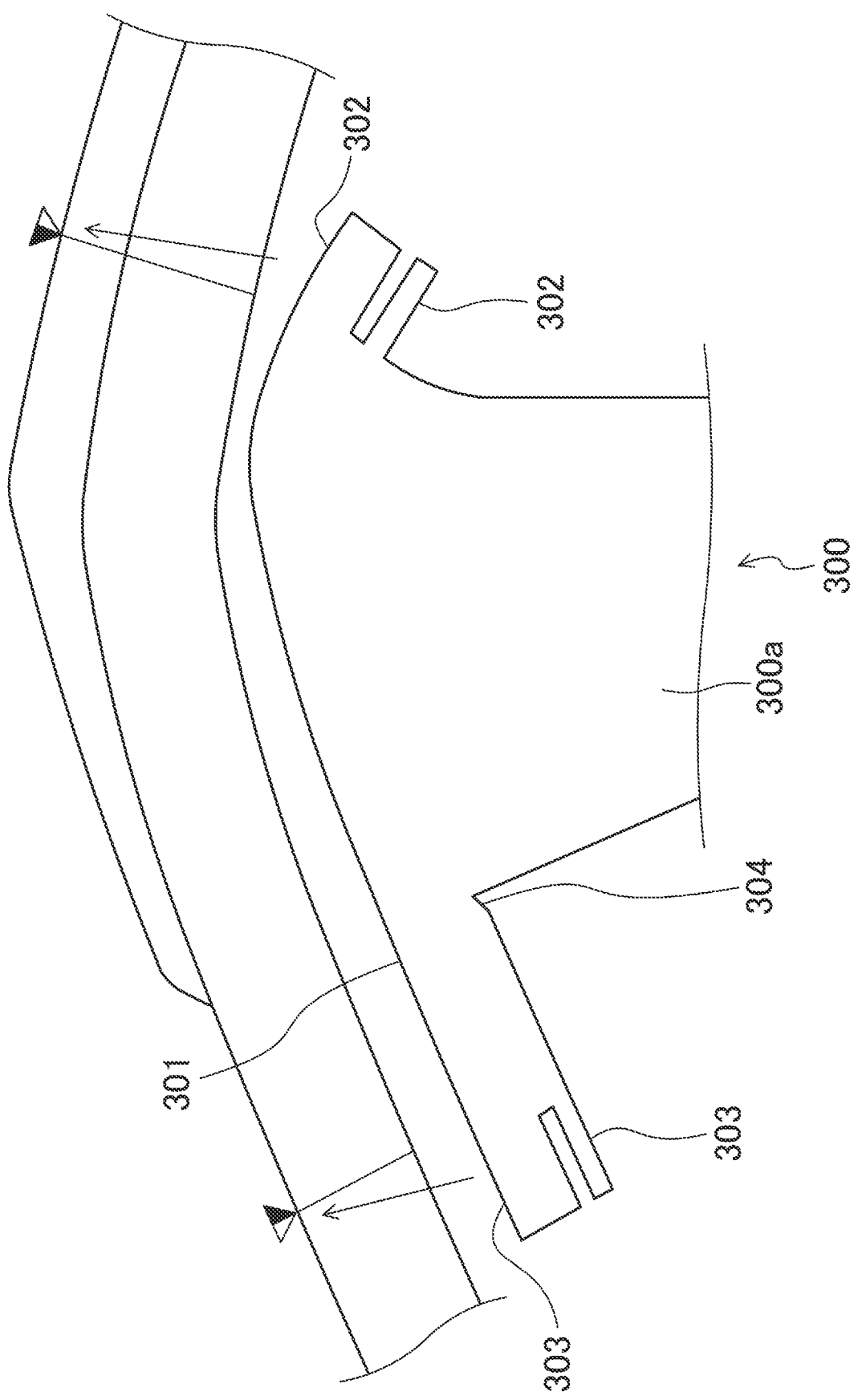
FIG. 16 is a diagram corresponding to FIG. 12 and showing a state in which the core is completely removed from the front die-molded portion.
Figure 17:
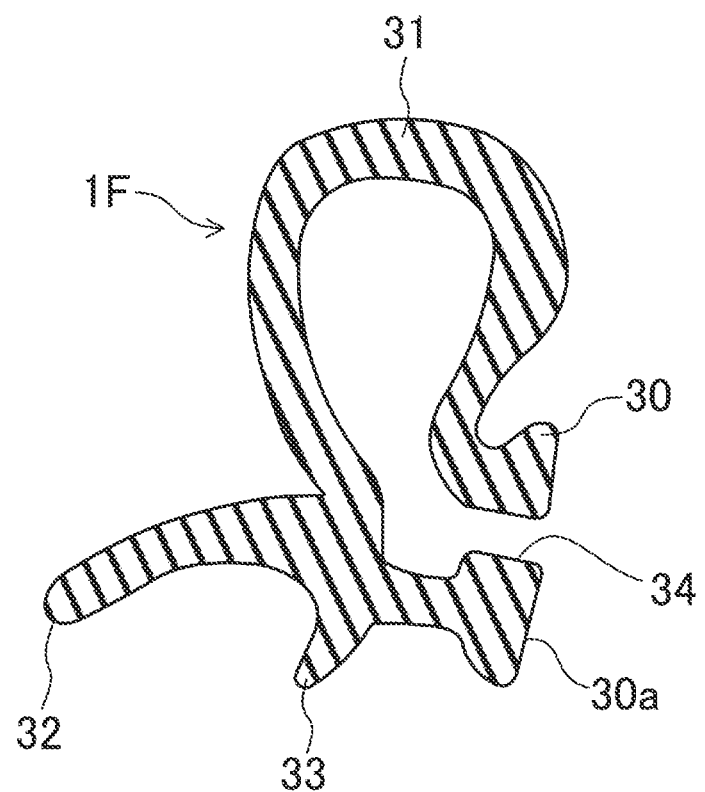
FIG. 17 is a cross-sectional view taken along line XVII-XVII in FIG. 3.

Next, after removing the first insertion portion 302, as shown in FIG. 15, the bent portion 30A of the front die-molded portion 1F is bent in the opposite direction (in the arrow direction) so as to be linear and moved toward the front vertical side extrusion-molded portion 1E (in the arrow direction), so that the second insertion portion 303 is removed from the hollow seal 21 and the vertical side hollow 23 of the front vertical side extrusion-molded portion 1E, and from the lower edge 34b of the core removal slit 34. Finally, as shown in FIG. 16, the core 300 can be completely removed through the core removal slit 34 (in the arrow direction).

Advantages of Embodiment

As described above, in this embodiment, the clip attachment hole 36 and the core removal slit 34 are provided in the bottom 30*a* so as to be aligned in the vertical direction. The core removal slit 34 is not bent in the transverse direction of the vehicle to avoid the clip attachment hole 36, which can reduce the size of the bottom 30*a* in the transverse direction of the vehicle. In addition, the core removal slit 34 is formed in the bottom 30*a* of the mount base 30, but not in a side surface (or a rear surface) of the mount base 30, thereby making it possible to reduce the size of the mount base 30 in the height direction.

In order to provide the clip attachment hole 36 and the core removal slit 34 so as to be aligned in the vertical direction, the core removal slit 34 needs to be shortened. This embodiment however provides the thick-walled portion 35 adjacent to the lower edge 34*b* of the core removal slit 34 and can thus reduce breakage at the lower edge 34*b* of the core removal slit 34 at the time of removing the core 300 through the core removal slit 34 after forming the front die-molded portion 1F.

The embodiment described above is a mere example in all respects and shall not be interpreted in a limited manner. All modifications and variations coming within the equivalency range of the appended claims are embraced within the scope of the present disclosure. The present disclosure is also applicable to the intermediate die-molded portion 1G and the rear die-molded portion 1H. If the upper edge 34*a* of the core removal slit 34 and the connected portion L2 are close to each other as illustrated in FIG. 7, the thick-walled portion 35 cannot be provided at a portion adjacent to the upper edge 34*a*. However, if the upper edge 34*a* and the connected portion L2 are as far apart from each other as the lower edge 34*b* and the connecting point L1 as illustrated in FIG. 7, the thick-walled portion 35 may be provided at a portion adjacent to the upper edge 34*a* of the core removal slit 34 (not shown).

As described above, the present disclosure is applicable to an automobile weather strip to be attached to a door on a side of an automobile, for example.

What is claimed is:

1. An automobile weather strip to be attached to a periphery of a door of an automobile to seal a gap between a circumferential edge of a vehicle body opening and the periphery of the door, the automobile weather strip comprising:
    an extrusion-molded portion formed by extrusion molding; and
    a die-molded portion formed by molding die and connected to a longitudinal end of the extrusion-molded portion,
    the extrusion-molded portion including:
        a mount base configured to be attached on the periphery of the door; and
        a hollow seal integrally molded with the mount base and coming into elastic contact with the circumferential edge of the vehicle body opening when the weather strip is attached to the periphery of the door,
    the die-molded portion including:
        a mount base configured to be attached to the periphery of the door; and
        a hollow seal integrally molded with the mount base of the die-molded portion and coming into elastic contact with the circumferential edge of the vehicle body opening when the weather strip is attached to the periphery of the door,
        the mount base of the die-molded portion including a bottom in a shape of a plate extending along the periphery of the door,
        the bottom having a core removal slit for removing a core used to form an inner surface of the hollow seal, the core removal slit extending in a longitudinal direction of the die-molded portion,
        the core removal slit having a length set shorter than a length of the core in a same direction,
        the bottom having a non-uniform thickness and including a thick-walled portion at a portion adjacent to an edge of the core removal slit, the thick-walled portion being thicker than other portions of the bottom and protruding in an inward direction from a side of the bottom that contacts the periphery of the door to reinforce the edge of the core removal slit.

2. The automobile weather strip of claim 1, wherein the thick-walled portion includes an inclined surface with an increasing thickness toward the edge of the core removal slit.

3. The automobile weather strip of claim 1, wherein the bottom has a clip attachment hole between a connected portion where the bottom is connected to the extrusion-molded portion and the edge of the core removal slit, the clip attachment hole being a hole to which a clip configured to engage with the periphery of the door is attachable.

4. The automobile weather strip of claim 1, wherein the thick-walled portion protrudes toward an opposite side from a contact side of the bottom with the periphery of the door.

5. The automobile weather strip of claim 4, wherein the thick-walled portion is in a shape of a ridge extending continuously in an inward-outward direction of a passenger compartment of the automobile.

* * * * *